(12) United States Patent
Fruhnert

(10) Patent No.: US 7,986,863 B2
(45) Date of Patent: Jul. 26, 2011

(54) CABLE HAVING FIRE-PROTECTION CHARACTERISTICS, AND METHOD FOR MANUFACTURING THE SAME

(75) Inventor: Stefan Fruhnert, Ebersdorf (DE)

(73) Assignee: CCS Technology, Inc., Wilmington, DE (US)

( * ) Notice: Subject to any disclaimer, the term of this patent is extended or adjusted under 35 U.S.C. 154(b) by 701 days.

(21) Appl. No.: 11/795,191

(22) PCT Filed: Jan. 12, 2006

(86) PCT No.: PCT/DE2006/000040
§ 371 (c)(1),
(2), (4) Date: Jul. 12, 2007

(87) PCT Pub. No.: WO2006/074647
PCT Pub. Date: Jul. 20, 2006

(65) Prior Publication Data
US 2011/0097047 A1 Apr. 28, 2011

(51) Int. Cl.
*G02B 6/44* (2006.01)
(52) U.S. Cl. ......... 385/100; 385/102; 385/103; 385/106
(58) Field of Classification Search .................. None
See application file for complete search history.

(56) References Cited

U.S. PATENT DOCUMENTS

| | | | | |
|---|---|---|---|---|
| 4,381,140 A * | 4/1983 | van der Hoek et al. | ....... | 385/104 |
| 4,913,517 A | 4/1990 | Arroyo et al. | ............. | 350/96.23 |
| 6,122,424 A | 9/2000 | Bringuier | ....................... | 385/100 |
| 6,173,100 B1 | 1/2001 | Newton et al. | ................. | 385/102 |
| 6,278,826 B1 * | 8/2001 | Sheu | .............................. | 385/109 |
| 6,501,887 B1 | 12/2002 | Bringuier et al. | ............ | 385/109 |
| 6,577,796 B2 * | 6/2003 | Anelli et al. | ................ | 385/112 |
| 6,749,446 B2 * | 6/2004 | Nechitailo | ..................... | 439/114 |
| 6,760,523 B2 * | 7/2004 | Nechitailo | ..................... | 385/112 |
| 6,970,629 B2 * | 11/2005 | Lail et al. | ....................... | 385/100 |
| 7,006,740 B1 * | 2/2006 | Parris | ............................. | 385/109 |
| 7,231,119 B2 * | 6/2007 | Rhoney et al. | ................ | 385/100 |
| 7,336,873 B2 * | 2/2008 | Lail et al. | ....................... | 385/100 |
| 2002/0154873 A1 * | 10/2002 | Sheu | ............................. | 385/114 |
| 2003/0031818 A1 | 2/2003 | Horacek | ........................ | 428/36.9 |
| 2005/0180704 A1 * | 8/2005 | Terry et al. | ..................... | 385/100 |

FOREIGN PATENT DOCUMENTS

| | | |
|---|---|---|
| DE | 19505464 | 2/1995 |
| DE | 19837998 | 8/1998 |
| DE | 19910342 | 3/1999 |
| EP | 0475778 A2 | 9/1991 |

* cited by examiner

*Primary Examiner* — Tina Wong
(74) *Attorney, Agent, or Firm* — C. Keith Montgomery

(57) ABSTRACT

A cable is provided which is longitudinally waterproof and has improved fire protection characteristics. The cable contains a composite material with a first substance which can be expanded by water being supplied to it, and a second substance which can be foamed by heat being supplied to it and is suitable for production of a glass layer. The composite material also has a substrate to which the first substance and the second substance are bonded. The composite material can be produced by dissolving the first substance and the second substance in a solvent, and by introducing the solvent into the support material, or by applying it to the support material.

17 Claims, 3 Drawing Sheets

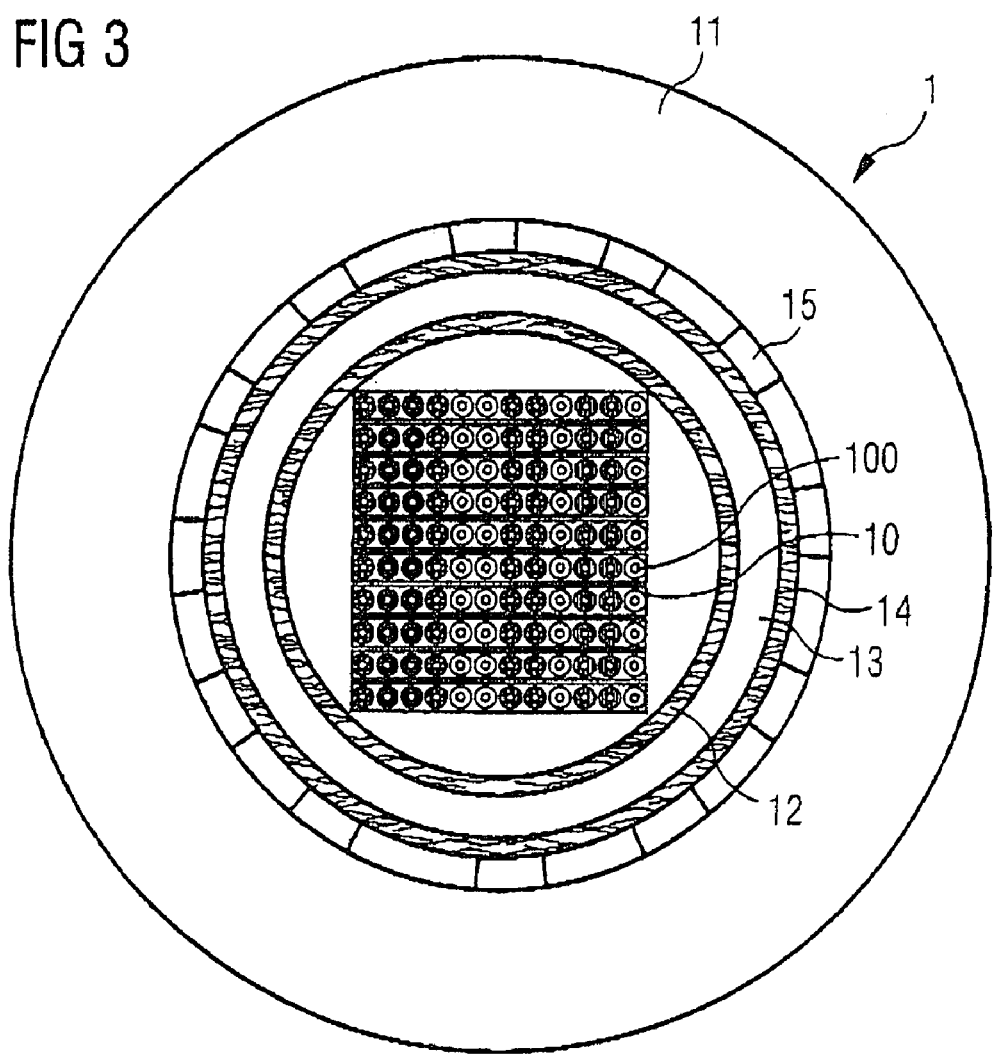

CABLE HAVING FIRE-PROTECTION CHARACTERISTICS, AND METHOD FOR MANUFACTURING THE SAME

FIELD OF THE INVENTION

The invention relates to a cable with fire protection characteristics and methods for manufacturing the same. In particular, the invention relates in particular to fiber optic cables having fire-protection characteristics.

BACKGROUND OF THE INVENTION

The document U.S. Pat. No. 6,122,424 describes an optical cable which has a plurality of optical waveguides, a sleeve surrounding the optical waveguides, and a cable sheath surrounding the sleeve. A component which contains a flame-retardant substance and a water-absorbent substance is arranged between the sleeve and the cable sheath. Antimony-trioxide, chlorinated paraffins, bromium-phosphorous compounds, aluminium trihydrate, zinc borate, magnesium hydroxide and tin compounds are specified as suitable flame-retardant substances. For suitable water-absorbent substances, reference is made to the document U.S. Pat. No. 4,913,517, which specifies super-absorbent materials based on polyacrylic acids, polyacrylonitrile or polyvinyl alcohol.

An optical cable is known from the document U.S. Pat. No. 6,501,887 B1, which has a plurality of ribbons of optical waveguides, a sleeve surrounding the ribbon, and a cable sheath surrounding the sleeve. A layer composed of an inherently flame-retardant material is arranged between the sleeve and the cable sheath, and is covered by a layer composed of a material which can expand. Natural or synthetic micas, glasses, polyimides and aramides are specified as suitable flame-retardant materials. Super-absorbent polymers and in particular partially cross-linked acrylate polymers are specified as suitable materials which can expand.

A fire protection element which is suitable for installation in a building is known from the document DE 198 37 998 A1, which has a core composed of a water glass which is enclosed in a gastight and watertight manner with a residual water content of 20 to 40 per cent by weight and a sheath composed of a polyurethane foam with a foam weight of 10 to 100 grams per liter. The water glass has a mol ratio of $SiO_2/Na_2O$ of 3.41, and 25 per cent by weight of water of crystallization. When the water glass is heated to a temperature of about 200° C., then the water of crystallization is emitted in the form of water vapour resulting in a solid mineral foam, which withstands temperatures of 1000° C. for up to 240 minutes.

An optical cable which has a plurality of optical waveguides and a cable sheath surrounding the optical waveguides is known from the document US 2003/0031818 A1. The cable sheath contains a halogen-free plastic. Polyethylene, polypropylene and polyurethane are specified as suitable halogen-free plastics. In order to improve the fire protection characteristics, the cable sheath also contains a foam-forming substance and a glass-forming substance. Water glasses, expandable micas, compressed graphites and mixtures of these substances are specified as suitable foam-forming substances. Salts of boric acid, salts of silicide acid and salts of phosphoric acid are specified as suitable glass-forming substances.

Further known flame-retardant substances which are introduced into a cable sheath are, for example, aluminium hydroxide or magnesium hydroxide. The introduction of flame-retardant substances into the cable sheath may have a disadvantageous influence on other characteristics of the cable sheath. For example, the resistance to tearing of the cable sheath may be reduced. This effect may in fact be desirable. However, in general, the cable sheath should have good resistance to tearing, in order to effectively protect the cable interior.

SUMMARY OF THE INVENTION

The object of the invention is to provide a longitudinally waterproof cable with improved fire protection characteristics. In particular, the invention is intended to lead to lengthening of the life of the cable in the event of fire.

A cable according to the invention has a cable sheath and a composite material which is surrounded by the cable sheath and contains a first substance, a second substance and a substrate. The first substance can expand when water is supplied to it. The second substance can be foamed by heat being supplied to it, and is suitable for production of a glass layer. The first substance and the second substance are bonded to the substrate.

The composite material is disposed together with further cable components in the cable interior, which is surrounded by the cable sheath, and comprises both a first substance, which acts as an expanding material, and a second substance, which acts as a foam former and glass former. The cable interior is initially dry and has a cavity in which, inter alia, optical waveguides are arranged. If water penetrates into the cable interior at some point and comes into contact with the first substance, then this initiates an expanding process, during which the water is absorbed by the first substance, and the first substance expands to form a waterproof sealing material. After this, the further cable components are surrounded by the sealing material on all sides. Further ingress of water into the cable interior and propagation of water that has entered in the longitudinal direction of the cable are thus precluded. If heat enters the cable interior at any point and the temperature of the foam former exceeds a specific limit, then a foaming process is initiated, during which the second substance foams forms a foam, with gas or steam being produced. The further cable components are subsequently surrounded on all sides by the foam. The foam has pores and thus acts as a thermal insulator. This delays the penetration of heat to the further cable components, as well as propagation of the heat along the cable. The foaming process is completed by glass formation on the surface of the foam.

The foaming of the second substance results in an increase in volume of 600 per cent, with a soft foam being formed. If the soft foam is subjected to a high temperature for a suitable time, then a hard glass layer is formed on the foam surface. If water is supplied to the cable during the foaming of the second substance, for example because extinguishing water is used in the event of a fire, then salts contained in the first substance can enhance the foaming process of the second substance.

Both the ingress of water into the cable interior and a temperature increase therefore result in an increase in the volume of the composite material, and the composite material expanding into a cavity surrounding the further cable components in the cable interior. On the basis of these analogies between the expanding process and the foaming process, the first substance which acts as the expanding material and the second substance which acts as a foam former and glass former are arranged at comparable suitable points in the cable interior. It is thus particularly advantageous to integrate the first substance and the second substance in a common substrate, and to arrange the composite material formed in this way at suitable points in the cable interior.

In a first alternative, the substrate comprises a first support layer and an adhesive, with the first substance and the second substance being arranged in or on the first support layer and being bonded to the first support layer by the adhesive. The adhesive is preferably water-soluble, so that the bonds between the first substance and the second substance on the first support layer are dissolved as soon as the composite material comes into contact with water.

In a first variant of the first alternative, the composite material is produced by a powder which contains the first substance and the second substance first of all being applied to a support layer, with the support layer being only partially covered. The adhesive is then applied to the powder and to the support layer, with grains of the powder being adhesively bonded to the exposed parts of the support layer. In a second variant of the first alternative, the composite material is produced by first of all applying the adhesive as an adhesive layer to the support layer. The powder which contains the first and the second substance is then scattered on it, with the grains of the powder being adhesively bonded to the adhesive layer. The powder may contain grains which each contain the first substance and the second substance. The powder may also contain grains which each contain the first substance or the second substance.

In a second alternative, the substrate comprises a first support layer and a second support layer, with the first substance and the second substance being held between the first support layer and the second support layer. The powder or the powder mixture is first of all applied to the first support layer. The first support layer and the second support layer are then connected to one another. By way of example, the powder is arranged only over a central area of the first support layer. The second support layer can then be connected to the first support layer in an edge area which surrounds the central area. The first support layer and the second support layer are preferably composed of polyethylene. The first support layer and the second support layer can be adhesively bonded by heating of the polyethylene. The first substance and the second substance are enclosed between the first support layer and the second support layer, and are thus protected against wear.

The composite material preferably comprises a felt, a powder and an adhesive. The felt contains individual fibres composed of a support material. The powder contains the first substance and the second substance, and has grains. The grains of the powder are bonded by the adhesive to the felt. The powder may be held between individual fibres of the felt for example by adhesion forces or capillary forces. The powder can also be held on the surface of the felt by electrostatic forces, if the powder or the felt is electrostatically charged. The powder may contain grains which each contain the first substance and the second substance. The powder may also contain grains which each contain the first substance or the second substance.

It is also feasible for the support material to form a chemical bond with the first substance and/or the second substance.

The first substance is preferably composed of a water-absorbent polymer. The polymer has monomers which can form a chemical or physical bond with water molecules.

The polymer is preferably at least partially cross-linked. The macromolecules of the polymer are thus bonded to one another to form a three-dimensional network. If the macromolecules of the polymer are bonded with water, then the volume of the polymer is increased. However, the polymer always forms a flexible and cohesive mass.

The polymer preferably contains a polyacrylate, a polyacrylate acid, an at least partially neutralized derivative of a polyacrylic acid, a polyethylene oxide, a derivative of cellulose or starch, a polyvinyl alcohol, a polyvinyl ether, a polymaleic acid, an acrylamide, an acrylonitrile or an acrylate ester.

The second substance preferably contains silicon and an alkali metal. The second substance preferably contains silicon dioxide and an alkaline oxide. The alkaline oxide is preferably $Na_2O$ or $K_2O$. The ratio of the molar numbers of the silicon dioxide and of alkaline oxide is preferably at least 3 to 1. The second substance preferably contains a sodium silicate or potassium silicate holding water of crystallization.

Sodium or potassium silicates are salts of silicic acid ($H_2SiO_3$). The silicon atoms and oxygen atoms form a three-dimensional network in which sodium ions or potassium ions are embedded. Sodium silicates are produced by fusing together sodium carbonate ($Na_2CO_3$, soda) and quartz sand ($SiO_2$) that is as pure as possible. Potassium silicates are produced by fusing together potassium carbonate ($K_2CO_3$, potash) and quartz sand ($SiO_2$) which is as pure as possible. The quartz sand contains about 99.7 per cent quartz, with the remainder being made up of iron, calcium, aluminium and titanium. The sodium carbonate or potassium carbonate is used to reduce the melting point of the quartz. The process of fusing together is carried out at temperatures of 1300° C. Solid water glass is formed on solidification of the melt.

Liquid water glass is produced by dissolving solid water glass in water, preferably at temperatures of between 150° C. and 160° C. and at an appropriate increased pressure. The resultant solution reacts in a highly alkaline form. If air is applied to the solution, then the $CO_2$ in the air results in neutralization of the water glass. The solution cures to form a flexible water glass, which contains a sol or gel of silicic acid. The flexibility of the water glass depends on the water content. A high water content results in high flexibility. The rate of curing and the strength of the water glass depend on the mol ratio between $SiO_2$ and the alkaline oxide, that is to say $Na_2O$ or $K_2O$. The mol ratio between $SiO_2$ and alkaline oxide is the number of stoichiometric units of $SiO_2$ divided by the number of stoichiometric units of the alkaline oxide. A water glass in which the mol ratio between $SiO_2$ and the alkaline oxide is equal to or greater than 3, is not alkaline and is not hydroscopic, and is scarcely attacked by water at room temperature. A water glass in which the mol ratio between $SiO_2$ and the alkaline oxide is, for example, only 2 is in contrast somewhat hydroscopic and can become baked together when stored in moist air.

The second substance preferably also contains chamotte (clay minerals), feldspar (aluminosilicate), micas (phyllosilicates) or graphite. The chamottes contain water and decompose at temperatures of about 500° C., with this water being emitted, resulting in silicic acid. The feldspar and micas are used to reduce the melting point of the quartz. The graphite can assist the formation of a carbon layer on the surface of the foam. A carbon layer such as this can withstand temperatures of up to 1200° C.

In a first variant, the cable preferably has one transmission element. The cable sheath surrounds the transmission element. The composite material surrounds the transmission element. The transmission element is used for transmission of optical or else electrical signals.

The transmission element preferably has one optical waveguide. The optical waveguide comprises a glass fiber and a coating surrounding the glass fiber. The coating contains the composite material. By way of example, the coating on the optical waveguide may contain an acrylate.

The transmission element is preferably composed of a plurality of optical waveguides and a core sleeve. The core sleeve surrounds the plurality of optical waveguides. The core sleeve contains the composite material. By way of example, the core sleeve may contain a support material and a powder or powder mixture. The molecular structure of the support material then results in a matrix in which the grains of the powder or powder mixture are embedded.

The transmission element, which is surrounded by the composite material is formed, for example, by first of all providing one optical waveguide, which is surrounded by a support material, or a bundle of optical waveguides which is surrounded by a support material. A solution is then produced which contains the first substance, the second substance and a solvent. Instead of the solution, it is also possible to produce a dispersion with colloids of the first and second substances. The optical waveguide or the bundle of optical waveguides is then immersed in the solution or dispersion, with the coating being impregnated with the solution.

In a second variant, the cable has one transmission element which is surrounded by the cable sheath, and a thread-like element which is arranged between the transmission element and the cable sheath. The thread-like element contains the composite material. The thread-like element may comprise a yarn and a coating applied to the yarn, with the coating containing the composite material. The thread-like element may also be formed integrally from the composite material. The thread-like element may be formed by extruding a filament from a melt. The melt and the filament then comprise a homogeneous mass of support material and a powder or powder mixture which is embedded in this support material and contains the first substance and the second substance.

A method according to the invention for manufacturing a cable comprises a plurality of steps. A first substance, which can be expanded by water being supplied to it, and a second substance, which can be foamed and forms glass when heat is supplied to it, a solvent and a support material are provided. The first substance and the second substance are dissolved in the solvent, thus resulting in a solution. The solution is introduced into the support material or is applied to the support material, with a composite material being formed. Instead of a solution, it is also possible to produce a dispersion, in which colloids are dissolved, which contain the first substance and the second substance.

In addition, one transmission element is preferably provided. The transmission element is surrounded by the composite material. The composite material is surrounded by a cable sheath.

It is also possible to introduce a monomer or oligomer which can be polymerized by radiation into the solution, and to irradiate the solution which has been introduced into the support material. The irradiation of the monomer or oligomer which is located in the solution, for example by visible, infrared or ultraviolet light, then results in the composite material being cured.

BRIEF DESCRIPTION OF THE FIGURES

FIG. 3 shows a second variant of the cable according to the invention.

DESCRIPTION OF THE INVENTION

Figure 1:
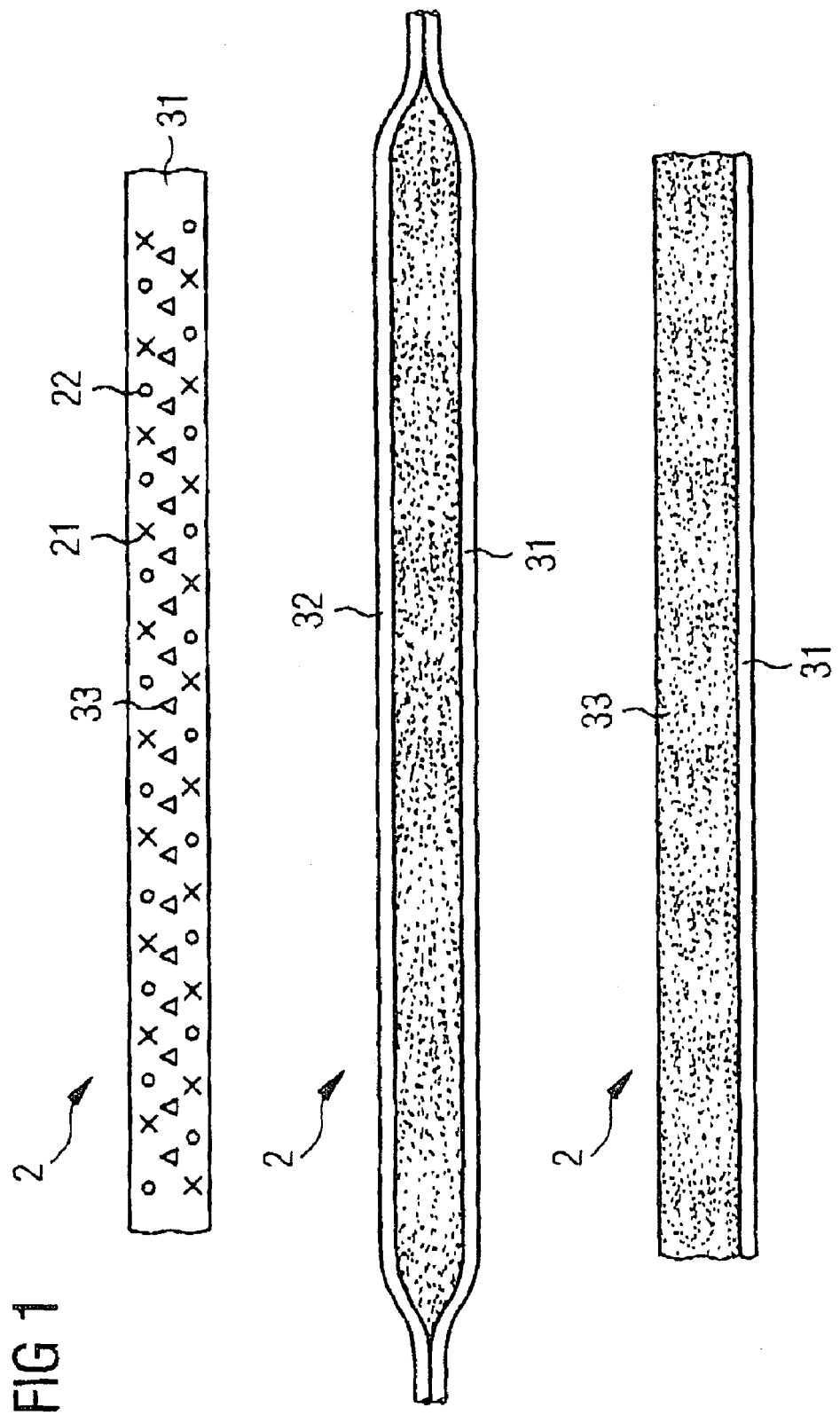
FIG. 1 shows three variants of the composite material of a cable according to the invention.

The upper section of FIG. 1 shows a first variant of the composite material of a cable according to the invention. The composite material 2 has a support layer 31, a first substance 21, a second substance 22 and an adhesive 33. The first substance 21 can be expanded by supplying water to it. The second substance 22 can be foamed by supplying heat to it. The first substance 21 and the second substance 22 are arranged in the support layer 31. The adhesive 33 may, in particular, comprise a plastic which can be cured by radiation and results in the first substance 21 and the second substance 22 being bonded to the support layer 31.

A second variant of the composite material of a cable according to the invention is illustrated in the central section of FIG. 1. The composite material 2 has a first support layer 31, a second support layer 32, a first substance 21 and a second substance 22. The first substance 21 can be expanded by water being supplied to it. The second substance 22 can be foamed by heat being supplied to it. The first substance 21 and the second substance 22 are arranged between the first support layer 31 and the second support layer 32. The first support layer 31 and the second support layer 32 may each have a central area and an edge area surrounding the central area, with the first substance 21 and the second substance 22 being arranged between the central areas of the first support layer 31 and of the second support layer 32, and with the edge areas of the first support layer 31 and of the second support layer 32 being attached to one another, in particular being adhesively bonded to one another. The first substance 21 and the second substance 22 are in this case surrounded by a composite formed by the first support layer 31 and the second support layer 32.

A third variant of the composite material of a cable according to the invention is illustrated in the lower section of FIG. 1. The composite material 2 has a first support layer 31, a first substance 21, a second substance 22 and an adhesive 33. The first substance 21 can be expanded by supplying water to it. The second substance 22 can be foamed by supplying heat to it. The first substance 21 and the second substance 22 are arranged on the support layer 31. The adhesive 33 may in particular comprise a monomer or oligomer which can be cured by radiation, resulting in the first substance 21 and the second substance 22 being bonded to the support layer 31.

The first substance 21 and the second substance 22 may each be in the form of powder. A typical grain size for a powder which contains the first substance is in the range from 1 to 100 micrometers. A typical grain size for a powder which contains the second substance is in the region of 30 micrometers.

The adhesive 33 which is described in the first and third variants of the composite material is in each case water-soluble. If the composite material comes into contact with water, the bond of the first substance and of the second substance to the substrate is then dissolved, so that the first substance can expand without any impediment. The first substance 21 and the second substance 22 may, for example, also be bonded by covalent bonding, by van-der-Vaals bonding, by electrostatic forces, by adhesion forces or capillary forces to the support material.

The composite material may be introduced into a cable 1 in many ways. In general, direct integration of the first and second substances into felts, yarns, cords, filaments or adhesives is feasible, or integration of the first and second substances into a coating. In this case, not only felts, yarns, cords or filaments may be coated, but also, for example, steel casings. A typical value for the layer thickness of the coating is in the region of 0.1 millimeters.

Figure 2:
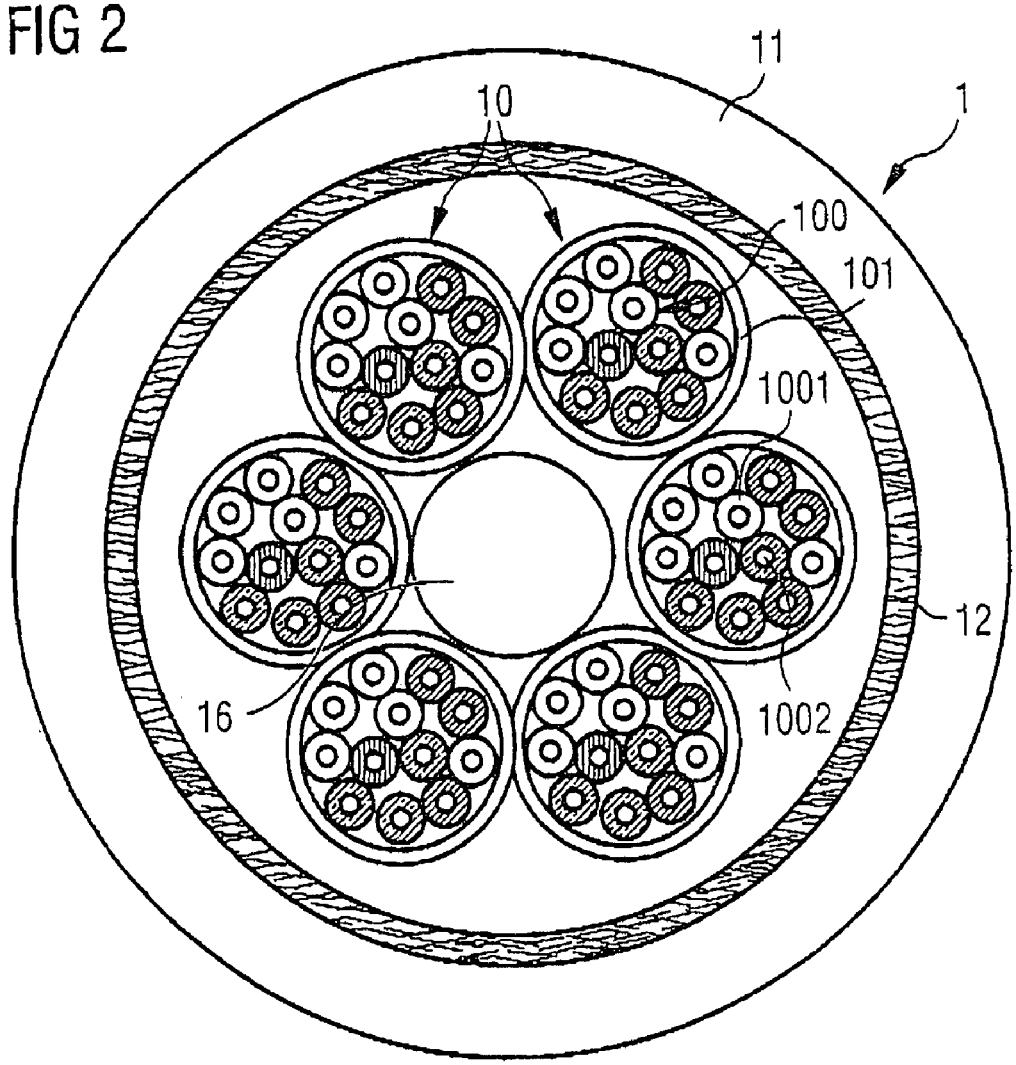
FIG. 2 shows a first variant of the cable according to the invention.

FIG. 2 shows a first variant of the cable according to the invention. Cable 1 has a cable sheath 11, a felt 12 which is surrounded by the cable sheath 11, and a cable core which is surrounded by the felt 12. The cable core has a central element 16 which is arranged centrally in cable 1, and a plurality of transmission elements 100 which are arranged around the central element 16. One of the transmission elements 10 in each case surrounds a plurality of optical waveguides 100 and a core sleeve 101, which surrounds the plurality of optical waveguides 100. One of the optical waveguides 100 in each case has a glass fiber 1002 and a coating 1001, which surrounds the glass fiber.

In order to produce cable 1, a plurality of optical waveguides 100 are first of all provided. A plurality of transmission elements 10 are then produced. In order to produce each of the transmission elements 10, a core sleeve 101 is extruded around a plurality of optical waveguides 100. The transmission elements 10 are arranged around a central element 16 and are in this case preferably stranded in order to form a cable core. The cable core is surrounded by a felt 12. A cable sheath 11 is then extruded around the felt 12.

In particular, cable 1 shown in FIG. 2 has the composite material 2 shown in FIG. 1. The composite material 2 has a first substance 21, which can be expanded by water being supplied to it, a second substance 22, which can be foamed by heat being supplied to it, and which is suitable for production of a glass layer, and a substrate 31 to 33, to which the first substance 21 and the second substance 22 are bonded. In this case, the substrate 31 to 33 of the composite material 2 may contain various components of cable 1.

In a first variant, the substrate 31 to 33 of the composite material 2 has a support layer 31 which is contained in felt 12 of the cable 1. Felt 12 may, for example, contain fibres composed of polypropylene. The first substance 21 and the second substance 22 are bonded for example via an adhesive 33, by adsorption, adhesion or capillary forces, between the fibres of the felt 12 or to the surface of the felt 12.

In a second variant, the substrate 31 to 33 of the composite material 2 has a support layer 31 which is contained in the central element 16. The central element 12 may be a filament which contains fibres composed of polypropylene. The first substance 21 and the second substance 22 are, for example, bonded to the fibres of the filament, between the fibres of the filament, or to the surface of the filament.

The central element 16 may also have a filament and a coating which acts as a support layer 31 and is applied to the surface of the filament. The first substance 21 and the second substance 22 are then bonded to this coating.

FIG. 3 shows a second variant of the cable according to the invention. Cable 1 has a cable sheath 11, a plurality of strain-relief elements 15 and a first felt 14, and a cable core which is surrounded by the first felt 14. The strain-relief elements 15 are arranged between the cable sheath 11 and the first felt 14. The cable core has an inner sheath 13, a second felt 12 which is surrounded by the inner sheath 13, and a plurality of transmission elements 10 configured as ribbons which are surrounded by the second felt 12. Each of the transmission elements 10 has a plurality of groups of optical waveguides 100. The optical waveguides each have a glass fiber and a plastic sleeve which surrounds the glass fiber. One group of optical waveguides 100 is in each case arranged alongside one another to form a ribbon, with the plastic sleeves of adjacent optical waveguides being adhesively bonded to one another. The ribbons which are formed from the groups of optical waveguides 100 are arranged to form a ribbon stack (not numbered).

In order to produce cable 1 of FIG. 3, a plurality of optical waveguides 100 are first of all provided. A plurality of transmission elements 10 are then produced. In order to produce one of the transmission elements 10 in each case, a plurality of the optical waveguides are coated with plastic sleeves, are arranged alongside one another and are adhesively bonded to form a ribbon. The transmission elements (i.e., the ribbons) are then formed into a ribbon stack. The ribbon stack is surrounded by a first felt 12. An inner sheath 13 is extruded around the first felt 12. The inner sheath 13 is surrounded by a second felt 14. Strain-relief elements 15 are arranged around the second felt 14. A cable sheath 11 is then extruded around the strain-relief elements 15, in order to form cable 1.

The substrates 31 to 33 of the composite material 2 have a support layer 31, which is contained in a respective felt, the felt 12 and/or the felt 14, of the cable 1. The respective felt may, for example, contain fibres composed of polypropylene. The first substance 21 and the second substance 22 are, for example, bonded via an adhesive 33, by adsorption, adhesion or capillary forces, between the fibres of the respective felt or to the surface of the respective felt.

The inner sheath 13 of the cable 1 may, for example, be a steel casing. The steel casing may have a seam running along the cable 1. Edge areas of the steel casing running along the seam may overlap, or may be separated by a gap. In both cases, the edge areas are adhesively bonded to one another by the composite material. The substrate of the composite material in this case therefore contains an adhesive. The steel casing is the support layer.

I claim:

1. A cable, comprising:
a cable sheath,
a composite material which is surrounded by the cable sheath, wherein the composite material comprises:
a first substance which can be expanded by water being supplied to it,
a second substance which can be foamed by heat being supplied to it,
a substrate to which the first substance and the second substance are bonded,
a felt,
a powder which contains the first substance and the second substance and has grains, and
an adhesive by means of which the grains of the powder are bonded in the felt.

2. The cable according to claim 1, wherein the first substance is composed of a polymer which absorbs water.

3. The cable according to claim 2, wherein the polymer is at least partially cross-linked.

4. The cable according to claim 2, wherein the polymer includes a material selected from the group of a polyacrylate, a polyacrylate acid, an at least partially neutralized derivative of a polyacrylic acid, a polyethylene oxide, a derivative of cellulose or starch, a polyvinyl alcohol, a polyvinyl ether, a polymaleic acid, an acrylamide, an acrylonitrile and an acrylate ester.

5. The cable according to claim 1, wherein the second substance contains silicon and an alkali metal.

6. The cable according to claim 1, wherein the second substance contains silicon dioxide and an alkaline oxide.

7. The cable according to claim 6, wherein the alkaline oxide is $Na_2O$ or $K_2O$.

8. The cable according to claim 6, wherein the ratio of the molar numbers of the silicon dioxide and of the alkaline oxide is at least 3 to 1.

9. The cable according to claim 1, wherein the second substance contains a sodium silicate or potassium silicate holding water of crystallization.

10. The cable according to claim 1, wherein the second substance also contains chamotte, feldspar mica or graphite.

11. The cable according to claim 1, comprising:
a transmission element which is surrounded by the cable sheath,
with the composite material surrounding the transmission element.

12. The cable according to claim 11, wherein the transmission element comprises one optical waveguide, the optical waveguide has a glass fiber and a coating surrounding the glass fiber, and the coating contains the composite material.

13. The cable according to claim 11, wherein the transmission element comprises a plurality of optical waveguides, which are surrounded by a core sleeve, and the core sleeve has a coating which contains the composite material.

14. The cable according to claim 1,
a transmission element which is surrounded by the cable sheath,
wherein the substrate is in the form of a thread, and is disposed between the transmission element and the cable sheath.

15. A method for manufacturing a cable, comprising the steps of:
providing a first substance which can be expanded by water being supplied to it, a second substance which can be foamed by supplying heat and forms glass, of a solvent and of a support material,
dissolving the first substance and second substance in the solvent, thereby forming a solution, introducing the solution into the support material or applying the solution to the support material, as a result of which the composite material is formed.

16. A method according to claim 15, comprising the steps of:
providing a transmission element,
surrounding the transmission element with the composite material,
surrounding the composite material with a cable sheath.

17. A method according to claim 15, comprising the steps of:
introducing a monomer or oligomer, which can be polymerized by radiation, into the solution, irradiating the composite material with radiation in order to cure it.

* * * * *